United States Patent
Ebrahimi Afrouzi et al.

(10) Patent No.: US 10,311,590 B1
(45) Date of Patent: Jun. 4, 2019

(54) METHOD FOR ESTIMATING DISTANCE USING POINT MEASUREMENT AND COLOR DEPTH

(71) Applicants: Ali Ebrahimi Afrouzi, San Jose, CA (US); Soroush Mehrnia, Copenhagen (DK)

(72) Inventors: Ali Ebrahimi Afrouzi, San Jose, CA (US); Soroush Mehrnia, Copenhagen (DK)

(73) Assignee: AI Incorporated, Toronto (CA)

( * ) Notice: Subject to any disclaimer, the term of this patent is extended or adjusted under 35 U.S.C. 154(b) by 128 days.

(21) Appl. No.: 15/447,122

(22) Filed: Mar. 2, 2017

Related U.S. Application Data

(60) Provisional application No. 62/302,095, filed on Mar. 1, 2016.

(51) Int. Cl.
| | |
|---|---|
| *H04N 7/18* | (2006.01) |
| *G06T 7/60* | (2017.01) |
| *G06T 7/90* | (2017.01) |
| *G01C 3/08* | (2006.01) |

(52) U.S. Cl.
CPC ............... *G06T 7/60* (2013.01); *G01C 3/08* (2013.01); *G06T 7/90* (2017.01); *H04N 7/18* (2013.01); *G06T 2207/10024* (2013.01); *G06T 2207/10028* (2013.01)

(58) Field of Classification Search
CPC ... G06T 7/60; G06T 7/90; G06T 2207/10024; G06T 2207/10028; G01C 3/08; H04N 7/18
USPC ............. 348/135; 382/106, 291, 199, 281
See application file for complete search history.

(56) References Cited

U.S. PATENT DOCUMENTS

| | | | |
|---|---|---|---|
| 5,521,695 A | 5/1996 | Cathey, Jr. et al. | |
| 6,057,909 A * | 5/2000 | Yahav | G01C 11/025 |
| | | | 313/103 CM |
| 6,847,435 B2 * | 1/2005 | Honda | G01C 3/08 |
| | | | 356/141.2 |
| 7,706,573 B1 * | 4/2010 | Motamedi | G01C 5/00 |
| | | | 382/106 |
| 8,140,395 B2 * | 3/2012 | Murphy | G06Q 10/087 |
| | | | 177/116 |
| 8,164,628 B2 | 4/2012 | Stein et al. | |
| 8,265,425 B2 * | 9/2012 | Ng-Thow-Hing | G06T 7/536 |
| | | | 382/199 |
| 8,467,578 B2 | 6/2013 | Chang et al. | |
| 8,705,801 B2 | 4/2014 | Kawamura et al. | |
| 2010/0118142 A1 | 5/2010 | Ohsawa | |

* cited by examiner

*Primary Examiner* — Trang U Tran

(57) ABSTRACT

A method for gathering information about a work environment comprising using two laser rangefinders to obtain distances to two obstacles. A camera captures an image of the area and an image processor extracts the color depth at the two points of the laser rangefinders. The image processor then extracts the color depth of the line connecting the two points of the laser rangefinders. If the color depth of the two points of the laser rangefinders and the line connecting them is within a predetermined range, the system identifies the area as a substantially flat surface. When a substantially flat surface is found, the system can calculate the length and angle of the line connecting the two points of the laser rangefinders.

12 Claims, 1 Drawing Sheet ial patent application Ser. No. 62/302,095 filed Mar. 1, 2016 by the present inventor.

METHOD FOR ESTIMATING DISTANCE USING POINT MEASUREMENT AND COLOR DEPTH

CROSS-REFERENCE TO RELATED APPLICATIONS

This application claims the benefit of the provisional patent application Ser. No. 62/302,095 filed Mar. 1, 2016 by the present inventor.

FIELD OF THE INVENTION

The present invention relates to distance measurement and estimation and two-dimensional mapping.

BACKGROUND

Creating a two dimensional map of a work environment is a common problem for mobile robotic devices that is being solved in various ways. SLAM (simultaneous localization and mapping) is one solution for creating a map of a work environment. However, SLAM requires expensive technology and a lot of processing power and time. A need exists for simpler methods for constructing environment maps. In some cases, a mobile robotic device's performance can be greatly increased with only a few important pieces of information, such as the location or existence of walls or other flat surfaces. A need exists for a method to detect flat surfaces.

SUMMARY

It is a goal of the present invention to provide a simple method for detecting characteristics about a physical environment. Two laser rangefinders positioned on a main body measure distances to obstacles. A camera captures images of the area, and the color depth at the points where the two laser rangefinders intersect with obstacles is obtained by an image processor. An image processor then analyzes the color depth of the points that form a straight line between the points where the two laser rangefinders intersect with obstacles. If the color depth of the line is within a predetermined threshold of the points, then the system identifies the area as substantially flat. Triangulation is also used to determine the angle and length of a surface.

DETAILED DESCRIPTION OF THE INVENTION

Figure 1A:
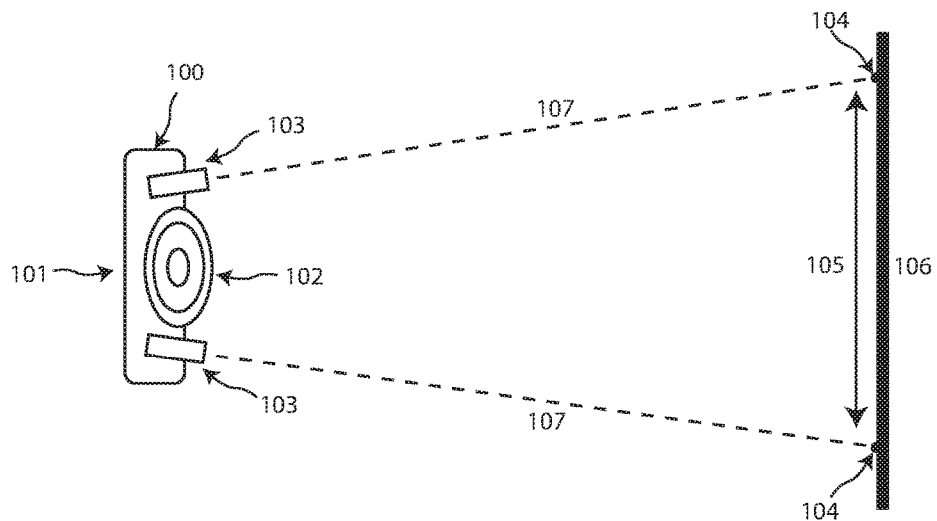
FIG. 1A illustrates the process of estimating distances to a flat wall embodying features of the present invention.

The present invention introduces a method for distance estimation and building a map of an environment using computer vision techniques to extract color characteristics of the environment. Two laser rangefinders, a camera, and an image processing unit are disposed on a main housing.

The camera and two laser rangefinders are positioned such that the laser rangefinders analyze predetermined lines of sight within the camera's image frame. The laser rangefinders measure the distance to the first encountered obstacle in their respective lines of sight. Each line of sight intersects with an obstacle at an arbitrary point, which shall be referred to herein as the first and second points. The camera captures an image of the area. In a next step, the image processing unit calculates the color depths at the first and second points. In a next step, the image processing unit calculates the color depth of the pixels that form a straight line between the first and second points (referred to herein as the Connecting Line) and compares the color depth of these pixels with the color depths of the first and second points. If the color depth of all the pixels in the Connecting Line is consistent with (or within a preset range of) the color depths of the first and second points, the system concludes that the distances of all the pixels in that region are within a threshold from the distances measured by the laser rangefinder at the first and second points. When the color depth of the Connecting Line is within a preset range of the color depths of the first and second points, we can assume that the surface or obstacle being analyzed is a substantially flat surface.

In some embodiments, the laser rangefinders are positioned such that they diverge from each other at a predetermined angle from vertical. (Laser rangefinders may also be positioned to diverge from each other at a predetermined angle from horizontal.) This will allow the system to analyze a greater distance between the first and second points.

In embodiments in which the laser rangefinders are positioned such that they diverge from each other at present angles, triangulation may be used to aid in building a map of the area being analyzed. In such embodiments, the laser rangefinders must be positioned at substantially a single origin point so that the lines of sight thereof together with the Connecting Line form a triangle. If the color depth along the Connecting Line is within the preset range of the first and second points, then the triangle formed by the laser rangefinders and the substantially flat surface may be analyzed. The point of origin of the laser rangefinders together with the points where each line of sight intersects with an obstacle form three vertices of a triangle. The length of the two sides of the triangle that are the lines of sights of the laser rangefinders are measured by the laser rangefinders, and the angle between them is known, so using this, the remaining angles and triangle side can be calculated by triangulation. Thus, the length of the Connecting Line can be calculated, and this information may be used in mapping a work area. Further, the angle of the detected flat surface can be estimated through triangulation and used in mapping the work area or for any other purpose. For example, a mobile robotic device may adjust its heading with respect to the angle of a wall when orientation is relevant to work.

Referring to FIG. 1A, an overhead view of the distance measurement method is illustrated. A distance measurement device 100 has a main body 101, a camera 102, and two laser rangefinders 103. The laser rangefinders 103 measure the distance to the first obstacle, in this case wall 106. The intersection of each laser rangefinder line of sight 107 with the obstacle 106 results in the first and second points 104. In a next step, the camera captures an image of the area and transmits it to the image processing unit. The image processing unit extracts color depth information at the points 104. Then, the image processing unit extracts the color depth information from the pixels that form the straight line 105 between the points 104. In a next step, the system compares the color depth of the pixels in line 105 with the color depth of the points 104. If the color depth falls within a predetermined threshold, the distance of the area in between the points 104 can be assumed to be within a predetermined range of the measured distances to the points 104.

Figure 1B:
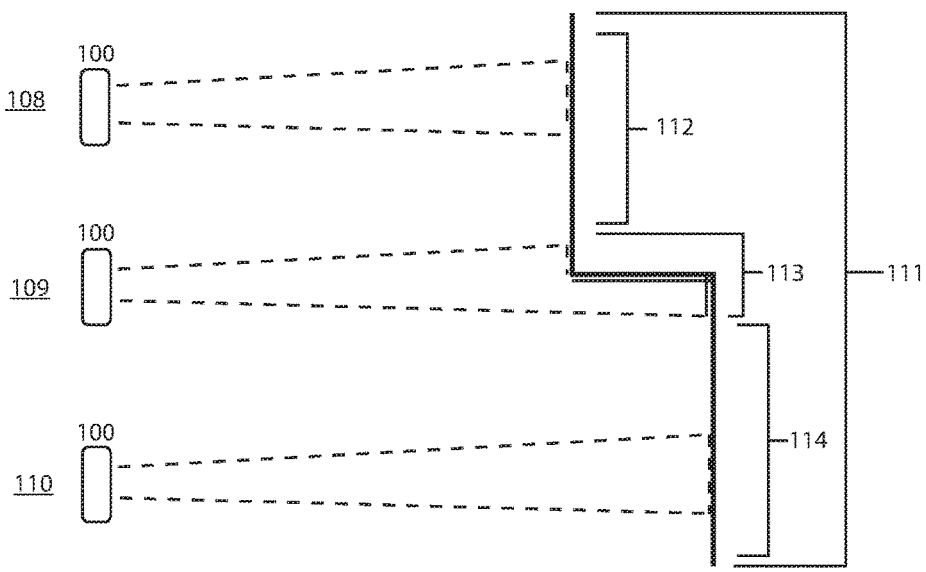
FIG. 1B illustrates the process of estimating distances to a wall that is not flat embodying features of the present invention.

Referring to FIG. 1B, an overhead view of the distance measurement method being used across a wall is illustrated. The wall 111 has two substantially flat portions 112, 114 and a portion 113 that is not flat. At location 108, distance measurement device 100 works in the same way as described above and detects a substantially flat surface. At location 109, the color depths at the two points will be substantially different from each other, so the system concludes that the surface between them is not flat. At location 110, the distance measurement device 100 analyzes the second flat portion 114 of the wall 111 and identifies it as flat.

We claim:

1. A method for a device to identify flat surfaces when mapping a work environment, the method comprising:
    positioning two laser rangefinders on a device;
    generating with each laser rangefinder a laser beam of which is sent to a location substantially opposite each laser rangefinder, each laser beam ending at a separate end point on a surface opposite the device;
    positioning a camera on the device;
    capturing with the camera an image of the surface opposite the device including the two points generated by the laser beams;
    positioning a processor on the device;
    the processor measuring the depth of color at the two points generated by the laser beams;
    the processor generating a straight line between the two points generated by the laser beams if the processor determines that the depth of color of the two points is within a predetermined threshold of a range of color;
    the processor measuring the depth of color of the pixels along the straight line generated by the processor; and,
    the processor identifying the straight line as being positioned on a substantially flat surface if the depth of color of the points of the straight line are within a predetermined range of color, within an internally generated map of the work environment of the device.

2. The method of claim 1 wherein the first and second laser rangefinders are positioned on the same horizontal plane at a preset angle diverging from each other.

3. The method of claim 1 wherein the first and second laser rangefinders are positioned on the same vertical plane at a preset angle diverging from each other.

4. The method of claim 2 wherein the first and second laser rangefinders are positioned at substantially the same origin.

5. The method of claim 4 wherein the first and second laser rangefinders are positioned at substantially the same origin.

6. The method of claim 1 further comprising using triangulation to determine a length and an angle of the straight line.

7. A distance estimation device comprising:
    a housing including a first and a second laser rangefinder positioned in a like plane, a camera positioned such that a field of view thereof captures the lines of sight of the first and second laser rangefinders within a predetermined range, and a processor,
    Whereby, each laser rangefinder generates a laser beam of which is sent to a location substantially opposite each laser rangefinder, each of the laser beams ending at a separate end point on a surface opposite the device, the camera capturing an image of the surface opposite the device including the two separate points, the processor measuring the depth of color at the two points, the processor generating a straight line between the two points if the processor determines that the depth of color of the two points is within a predetermined threshold of a range of color, the processor measuring the depth of color of the pixels along the straight line generated by the processor, and the processor identifying the straight line as being positioned on a substantially flat surface if the depth of color of the points of the straight line are within a predetermined range of color, within an internally generated map of the work environment of the device.

8. The distance estimation device of claim 7 wherein the first and second laser rangefinders are positioned on the same horizontal plane at a preset angle diverging from each other.

9. The distance estimation device of claim 7 wherein the first and second laser rangefinders are positioned on the same vertical plane at a preset angle diverging from each other.

10. The distance estimation device of claim 8 wherein the first and second laser rangefinders are positioned at substantially the same origin.

11. The distance estimation device of claim 9 wherein the first and second laser rangefinders are positioned at substantially the same origin.

12. The distance estimation device of claim 7 whereby the image processor uses triangulation to calculate an angle and length of the straight line between the first and second points.

* * * * *